Figure 1:
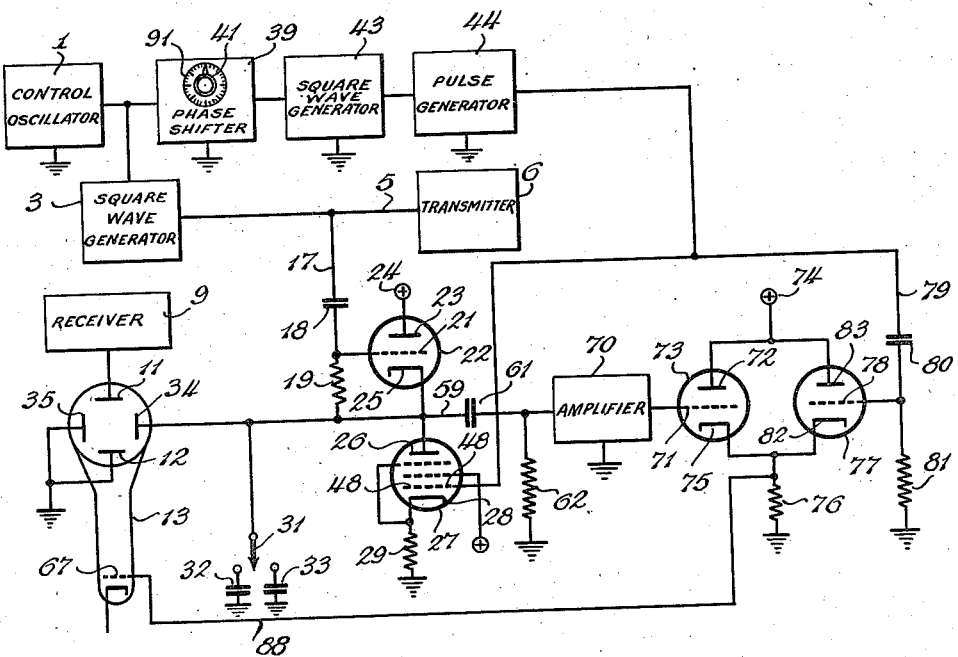

Nov. 16, 1948.  E. J. ISBISTER ET AL  2,453,711
CATHODE-RAY TUBE CONTROL CIRCUIT
Original Filed July 30, 1942

INVENTOR
ERIC J. ISBISTER
WALTER N. DEAN
BY Herbert H. Thompson
ATTORNEY.

Patented Nov. 16, 1948

2,453,711

UNITED STATES PATENT OFFICE 2,453,711

CATHODE-RAY TUBE CONTROL CIRCUIT

Eric J. Isbister, Forest Hills, and Walter N. Dean, Larchmont, N. Y., assignors to The Sperry Corporation, a corporation of Delaware Original application July 30, 1942, Serial No. 452,818. Divided and this application October 4, 1943, Serial No. 504,872

8 Claims (Cl. 315—22)

This invention relates to control circuits for cathode ray tubes which are particularly useful in radio detection systems such as that disclosed in copending application Serial No. 452,818, filed July 30, 1942, in the names of Eric J. Isbister et al., of which the present application is a division.

In such radio detection systems, the distance to a distant object may be determined by radiating a recurring sequence of pulses of high frequency radiant energy toward the target, receiving the pulses reflected therefrom, and positioning a member in accordance with the time-phase position of the received pulses relative to the transmitted pulses. According to the present invention, improved apparatus is provided for indicating correspondence between the positioning of this range-indicating or range-tracking member with the time-phase just referred to.

The improved range indication which indicates this correspondence is obtained by producing a wave shape on the screen of the cathode ray tube corresponding to the envelope of the entire received wave, and by magnifying the time scale of that portion of the indication corresponding to the time-phase position of the range indicating member. Further improved circuit means are provided for intensifying the indication of this magnified portion relative to the remainder of the trace, to provide a clearer and more useful type of indication.

The magnification of the time scale of a selected portion of the indication is accomplished by a control circuit for a cathode ray tube which periodically sweeps the electron beam across the screen of the tube and accelerates the beam during a selected portion of the sweep. In this manner, the indication on the screen is expanded or magnified for a predetermined interval the time phase of which is manually adjustable.

In order to maintain the intensity of the trace or indication during the accelerated period of the sweep, the intensity of the electron beam and the trace is controlled according to the instantaneous velocity of the beam. This is effected by differentiating the sweep voltage and applying the differentiated voltage to the intensity control grid of the cathode ray tube.

It is a major object of this invention to provide a control circuit for a cathode ray tube in which the rate of change of a varying sweep voltage may be varied for a predetermined interval.

A further object of the invention is to provide a range indicator for a pulse detection system in which the time-phase of a magnified portion of the trace indication is adjusted to correspond to the time-phase of a received pulse.

A further object of the present invention is to provide an improved electronic indicator for indicating the time-phase position of a control member relative to a periodic wave in such manner as to render the indication extremely clear and to attract attention thereto and focus interest thereon by magnifying a selected portion of the indication.

A still further object of the present invention is to provide improved circuit means for controlling the intensity of the trace of a cathode ray tube having a non-linear sweep voltage producing a non-linear sweeping of the cathode ray beam, whereby the effect of varying velocity of the electron beam upon the trace is substantially eliminated by the control of the intensity of the beam in accordance with this velocity, and the brightness of the trace may even be increased.

Figure 2:
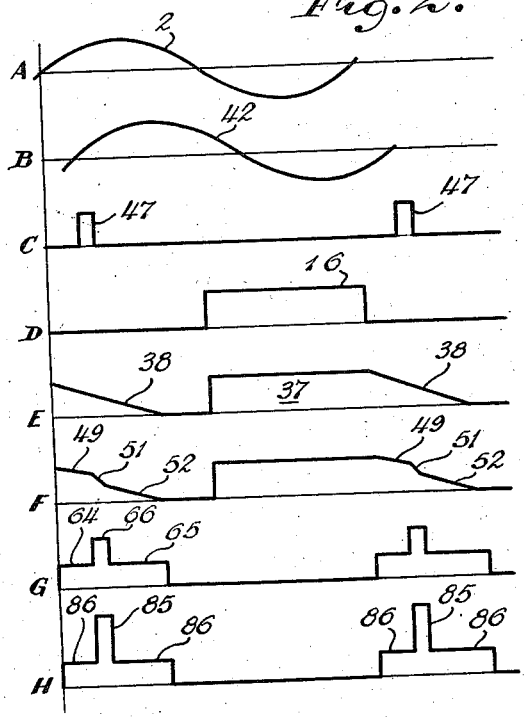
Figure 3:
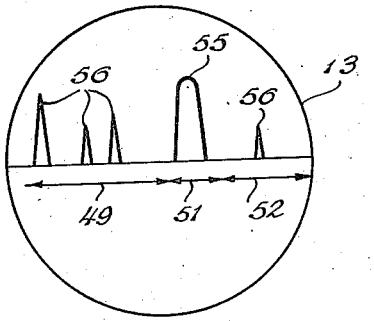

Further objects and advantages will become apparent from the following specification and accompanying drawings, wherein Fig. 1 is a schematic diagram of a control circuit for a cathode ray tube embodying the invention;

Fig. 2 shows a series of voltage versus time curves useful in explaining the operation of the circuits; and Fig. 3 shows a representation of the cathode ray tube screen during normal operations.

Referring first to Fig. 1, there is provided a control oscillator 1 of any conventional type adapted to produce an alternating control voltage of suitable frequency, preferably in the audio frequency range as represented by the sine wave 2 in Fig. 2A. Suitable values of this control frequency have been found to lie between 400 and 2,000 cycles per second. The output of control oscillator 1 is fed to a square wave generator oscillator 1 of any conventional type adapted to produce in its output a substantially square wave having a frequency corresponding to that of the control oscillator 1. The output of square wave generator 2 may be led, as by a conductor 5, to a high frequency transmitter 6 which radiates high frequency energy of short periodic pulses of high frequency energy of short duration and suitable amplitude, and having a repetition rate corresponding to the frequency of the square wave generator 3 and of the control oscillator 1.

The envelope of the wave radiated by transmitter 6 will then consist of a plurality of short pulses having a time phase and repetition rate determined by the voltage output wave 2 of the control oscillator 1. Since these pulses will take a finite time to travel to the reflecting object and back to a receiver 9, the received wave will contain corresponding pulses which are delayed in time phase with respect to the transmitted pulses by an interval $t$ proportional to the distance to the distant object.

In order to determine the range of the object from which received pulses are reflected, it is necessary to determine the time interval $t$ by which the pulses are delayed. This time interval may be determined by measuring the time-phase displacement between transmitted and received pulses. For this purpose, the entire received wave from receiver 9 is impressed upon vertical deflecting plates 11 and 12 of cathode ray indicating tube 13 so pulses corresponding to detected objects appear on the screen of the tube.

Horizontal deflection of the cathode ray beam is controlled by a sweep circuit having an accelerated portion which may be adjusted to coincide with a selected one of the received pulses. By calibrating the time phase of the adjusting member, it is possible to determine range of an object according to the time phase of pulses reflected therefrom with respect to transmitted pulses.

The electron beam is swept horizontally synchronously with the transmission of pulses of high frequency energy by a circuit that is controlled by the square wave generator 3.

A sweep square wave 16 (Fig. 2D) obtained from square wave generator 3 by means of lead 17 is impressed by way of a suitable coupling condenser 18 and grid resistor 19 upon the control grid 21 of a sweep control tube 22, whose anode 23 is connected directly to a source of positive potential such as 24, and whose cathode 25 is connected to the anode 26 of expander control tube 27, whose cathode 28 is connected to ground through a suitable biasing resistor 29. This sweep square wave 16 has a predetermined fixed phase relation with respect to the pulses radiated by the transmitter 6 since these radiated pulses are also derived from the square wave generator 3. Preferably, although not necessarily, the radiated pulses are initiated at the same instant as the square wave pulses 16 terminate.

Selectively connected between anode 26 of tube 27 and ground, as by means of a switch 31, are condensers 32, 33 having differing capacitances, applying as will be seen, different rates of sweep to horizontal deflecting plates 34 and 35 of the cathode ray tube 13. Assuming for the moment that condenser 32 is thus connected in the circuit by means of switch 31, it will be clear that during the positive half cycles of the sweep square wave 16, when tube 22 is conductive, condenser 32 will be charged to a voltage corresponding to the amplitude of the sweep square wave 16. The amplitude of the sweep square wave 16 and the value of resistor 19 are so chosen that during the negative half cycles of the sweep square wave 16, control tube 22 is completely blocked.

Accordingly, condenser 32 will then discharge through tube 27, providing a voltage to horizontal deflecting plates 34 and 35 of the type shown at 37 in Fig. 2E. The discharging voltage of condenser 32, corresponding to the portion 38 of wave 37, will vary substantially linearly with time, since pentode tube 27 is essentially a constant current device, as is well known. Hence this voltage may be used as a time sweep voltage for range indicator tube 13. However, this provides no indication of the relative phase position of the range pulses, as is desired.

In order to provide such an indication, the rate of change of this sweep voltage 38 is momentarily greatly increased at a selected time phase position.

The control voltage 2 derived from control oscillator 1 is conducted to an adjustable phase shifter 39 of any conventional type, whose phase shift is adapted to be controlled by manual control knob 41. The output of phase shifter 39 thus comprises a sine voltage wave adjustable in time-phase as shown at 42 in Fig. 2B. This voltage wave is supplied to a suitable square wave generator 43 and thence to a pulse generator 44 to produce pulses 47 as shown in Fig. 2C. It will be clear that, by suitable adjustment of phase shifter 39, the phase of the square wave output of generator 43 and of the pulses of generator 44 may be suitably adjusted with respect to that of control oscillator 1 as desired. The duration of these generated pulses 47 is preferably substantially equal to that of the transmitted pulses or slightly longer. These generated range pulses 47 from range pulse generator 44 are fed to control grid 48 of expander control tube 27 whose anode-cathode circuit is connected in shunt with condenser 32. During the interval between the range pulses 47 tube 27 exhibits a high resistance which determines the discharge rate of condenser 32 as represented by the slope of the portion 49 of the voltage wave shown in Fig. 2F. When a generated pulse 47 is applied to the grid 48, it serves to greatly increase the discharge rate of condenser 32 during the short duration of the pulse, as shown at 51 in Fig. 2F. After the cessation of the pulse 47, expander control tube 27 resumes its normal high resistance, and the discharge of condenser 32 then returns substantially to its original rate for the remainder of the sweep as shown at 52 in Fig. 2F.

Accordingly, for the predetermined interval 49 the cathode ray beam of indicator tube 13 is swept relatively slowly across the screen. During interval 51, the velocity of the sweep is greatly increased, thereby effectively magnifying the time scale for this portion of the sweep. For the remaining portion 52 of the sweep the slow rate is resumed.

Hence, as shown in Fig. 3, during the intervals 49 and 52, the image of the received wave will be of normal size. During interval 51, however, this image will be greatly widened. By making this widening effect of a marked character, a distinct indication is produced of the time phase position of the generated pulse 47 relative to the received wave.

Accordingly, the operator, to determine the range of an object, operates manual control 41 to maintain the image 55 (Fig. 3) of a selected received pulse in a magnified condition on the screen of indicator 13, while any other pulses 56, or noise waves will only have unexpanded appearance. In effect, by proper choice of the rate of change of the sweep voltage during intervals 49 and 52 relative to that during interval 51, pulses 56 of Fig. 3 may be made to have the character merely of short vertical line segments, whereas the actual wave shape of the desired received pulse 55 may be made much clearer by its magnification during interval 51.

The speeding up of the sweep of the electron beam in range indicator 13 causes a definite decrease in brightness of the trace produced thereby during this expanded portion. In order to avoid this effect and if desired, to make the brightness of the expanded portion of the trace greater than that of the remaining portion of the indication, an intensifier circuit is used to control the brightness of the trace.

For this purpose the sweep voltage applied to the horizontal deflecting plates 34 and 35 is also connected by lead 59 to a differentiating circuit comprising condenser 61 and resistor 62. As is well known, the voltage across resistor 62, if its resistance is of a low value compared to the reactance of condenser 61 at the frequency of the principal components of the input wave, will be substantially a pure time derivative of the voltage on lead 59. This voltage across resistor 62 is shown in Fig. 2G, having a constant low magnitude during intervals 64 and 65 corresponding to the low rates of change during the portions 49 and 52 of the sweep voltage, and having a high value 66 during the high rate of change portion 51 of the sweep voltage.

Since the brightness of the trace is substantially inversely proportional to the velocity of the trace and substantially directly proportional to the voltage applied to intensity control grid 67 of indicator 13, it will be seen that by impressing the voltage wave of Fig. 2G upon intensity control grid 67 the resulting trace will have substantially constant brightness during the entire sweep. Also, the electron beam will be effectively cut off during the periods in which the sweep voltage does not occur, as is very desirable in order to prevent stray indications which might confuse the operator.

However, it is preferable that the brightness of the expanded portion of the trace be further increased in order to provide more easily visible indication of the desired tracking condition. For this purpose it is necessary to increase the magnitude of the high amplitude portion 66 of the intensifier voltage of Fig. 2G.

The differential voltage across resistor 62 is applied through an amplifier 70 to control grid 71 of tube 73, whose anode 72 is connected to a source of high positive potential 74 and whose cathode 75 is connected to ground through a resistor 76.

A further tube 77 is provided in parallel with tube 73 and having its control grid 78 energized from the pulse generator 44 by way of lead 79, coupling condenser 80, and grid input resistor 81. Cathode 82 of the tube 77 is connected to common cathode bias resistor 76. Anode 83 of the tube 77 may be connected to the positive source 74.

As has been described above, and as is shown in Fig. 2G, the time phase position of the high amplitude portion 66 of the intensifier voltage is the same as the time phase position of the generated pulse 47; since tubes 73 and 77 are actuated by voltages as shown in Figs. 2G and 2C respectively, the currents through those tubes correspond to those waves. These currents are added in common cathode resistor 76 and, accordingly, the voltage appearing across the resistor 76 will have a wave form corresponding to the sum of the wave forms of Figs. 2G and 2C. In other words, it will have the wave form shown in Fig. 2H, in which the large amplitude portion 85 now has a magnitude which is increased relative to the magnitude of the low intensity portion 86.

This wave of Fig. 2H is then applied to the intensity control grid 67 of indicator 13 by way of lead 88 to produce the desired increased brightness of the expanded indication 55 shown in Fig. 3.

Since, as described above, the time phase of the reflected pulse relative to the radiated pulse is a measure of the distance or range of the reflecting object, it will be seen that the phase shift required to synchronize the generated pulses 47 with the reflected received pulses corresponds to the range of the object. Accordingly, the setting of manual control 41 may be used to indicate this range directly, by the use of a suitable scale 91 associated with the control 41.

From the foregoing description of the control circuit for the cathode ray tube it will be apparent that the velocity of the sweep of the electron beam may be varied during any desired portion of the sweep. The beam may be accelerated during an interval having an adjustable time phase relative to the normal sweep. By adjusting the time phase of the accelerated interval to coincide with the reception of a reflected pulse, it is possible to determine the range of an object from which energy is reflected since the normal sweep and the acceleration interval, as well as the transmitted pulses, are synchronized by the same control oscillator.

Since the intensity of the indication trace would normally decrease when the sweep is accelerated, the intensity control grid of the tube is controlled according to the velocity of the electron beam so the intensity of the trace is substantially constant. If desired, the trace can be made brighter during the accelerated period by actuating the intensity control grid by the same signal as that which controls the acceleration of the sweep.

Although the cathode ray tube control circuit described herein is applied to a radio range finder in an object detection system, it is not intended that it should be limited to such use. Obviously any source of signal to be observed might be substituted for the receiver 9, or the receiver might be used to detect signals other than those reflected by an object.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control circuit for a cathode ray tube having beam deflecting electrodes and a beam intensity control grid, comprising means for applying a varying sweep voltage of predetermined direction to said electrodes, means for changing the rate of variation but not the direction of said sweep voltage for a predetermined interval, and means actuated by said last-named means for controlling said grid to alter the brightness of the beam trace during said interval.

2. A control circuit for a cathode ray tube having beam deflecting electrodes and a beam intensity control grid, comprising means for applying a varying sweep voltage of predetermined direction to said electrodes, means for changing the rate of variation but not the direction of said sweep voltage for a predetermined interval, means actuated by said sweep voltage for controlling said grid to maintain the brightness of the beam trace of said tube substantially constant, and means actuated by said second-named means for further controlling said grid to increase the brightness of said trace during said interval.

3. A control circuit for a cathode ray tube having beam deflecting electrodes and an intensity control grid, comprising a sweep generator for applying a varying sweep voltage of predetermined direction to said electrodes, an expander connected to said sweep generator for changing the rate of variation but not the direction of said sweep voltage for a predetermined interval, and an intensifier actuated by said expander for controlling said grid to increase the brightness of the beam trace of said tube during said interval, the increase in brightness being substantially greater than the change in rate of variation of said sweep voltage.

4. A control circuit for a cathode ray tube having beam deflecting electrodes and an intensity control grid, comprising a sweep generator for applying a varying sweep voltage of predetermined direction to said electrodes, an expander connected to said sweep generator for changing the rate of variation but not the direction of said sweep voltage for a predetermined interval, a differentiating circuit connected to said sweep circuit for differentiating said sweep voltage, and an intensifier actuated by said differentiating circuit according to the rate of variation of said sweep voltage and by said expander for controlling said intensity control grid to increase the brightness of the beam trace of said tube during said interval, the increase in brightness being substantially greater than the change in rate of variation of said sweep voltage.

5. A sweep circuit for a cathode ray tube having beam deflecting electrodes comprising a condenser connected to said electrodes, alternately operative and inoperative means for charging said condenser, a variable resistance connected in parallel with said condenser for discharging said condenser at a substantially constant rate during inoperative periods of said charging means to supply a constantly varying sweep voltage to said electrodes, and means for changing said resistance to modify said discharge rate during a predetermined interval of said discharge period to change the rate of variation of said sweep voltage during said interval, the discharge of said condenser being restored to said substantially constant rate at the termination of said interval.

6. A sweep circuit for a cathode ray tube having beam deflecting electrodes, comprising a source of square wave voltage, a condenser connected across said electrodes, means for charging said condenser comprising a control tube having said condenser in the output circuit thereof, and means for controlling said control tube by said square wave, whereby said condenser is charged during positive portions of said square wave and is isolated from said source during negative portions of said square wave; a pentode tube connected in parallel with said condenser, whereby during said negative portions of said square wave said condenser discharges at a constant rate through said pentode, and means for modifying said constant rate, comprising means for applying a rate-modifying voltage to the control grid of said pentode during a predetermined interval, the control grid being returned to its original voltage during the remainder of each period following said interval.

7. A sweep circuit for a cathode ray tube as in claim 6 further including means for controlling the phase relation between said rate-modifying voltage and said square wave for adjusting the time relation of said interval.

8. In a control circuit for a cathode ray tube having beam deflecting means, sweep generator means for controlling said deflecting means according to a periodically varying sweep voltage to initially cause said beam to sweep in a predetermined direction at a first rate of speed, means for changing the rate of variation but not the direction of said sweep voltage for a predetermined interval during the period thereof to cause said beam to sweep at a second rate of speed during said interval, the rate of variation of said sweep voltage being restored at the termination of said interval to cause said beam to continue its sweep at said first rate of speed, and means for controlling the phase relation of said predetermined interval relative to the period of said sweep voltage for adjusting the time relation of said interval.

ERIC J. ISBISTER.
WALTER N. DEAN.

REFERENCES CITED

The following references are of record in the file of this patent:

UNITED STATES PATENTS

| Number | Name | Date |
|---|---|---|
| 1,934,322 | Osbon | Nov. 7, 1933 |
| 2,078,644 | Swedlund | Apr. 27, 1937 |
| 2,088,495 | Swedlund | July 27, 1937 |
| 2,101,520 | Tolson et al. | Dec. 7, 1937 |
| 2,181,309 | Andrieu | Nov. 28, 1939 |
| 2,182,608 | Andrieu | Dec. 5, 1939 |
| 2,215,197 | Sherman | Sept. 17, 1940 |
| 2,241,256 | Gouls | May 6, 1941 |
| 2,244,513 | Burton | June 3, 1941 |
| 2,269,226 | Rohats | Jan. 6, 1942 |
| 2,275,460 | Page | Mar. 10, 1942 |
| 2,280,524 | Hansen | Apr. 21, 1942 |
| 2,300,189 | Wolff | Oct. 27, 1942 |
| 2,313,967 | Read | Mar. 16, 1943 |
| 2,347,008 | Vance | Apr. 18, 1944 |
| 2,355,363 | Christaldi | Aug. 8, 1944 |
| 2,368,448 | Cook | Jan. 30, 1945 |
| 2,368,449 | Cook | Jan. 30, 1945 |
| 2,375,709 | Thompson | May 8, 1945 |